INVENTOR.
FREDERIC F. ZIND

United States Patent Office 3,337,429
Patented Aug. 22, 1967

3,337,429
SOLID ELECTROLYTIC CAPACITOR AND
PROCESS THEREFOR
Frederic F. Zind, North Olmsted, Ohio, assignor to Union
Carbide Corporation, a corporation of New York
Filed May 28, 1964, Ser. No. 370,826
6 Claims. (Cl. 204—38)

This invention relates to a capacitor having a solid or dry electrolyte. More particularly, it relates to a sintered tantalum pellet type of solid electrolytic capacitor having improved electrical properties.

Solid electrolytic capacitors are known in the art. The preferred type consists of a porous tantalum anode to which there are applied, in sequence, a dielectric film of $Ta_2O_5$, a semiconductive film of $MnO_2$, a layer of colloidal graphite and then a cathode layer of silver. The capacitor is completed by encasing the coated pellet in a suitable container and attaching leads to the anode and cathode.

Figure 1:
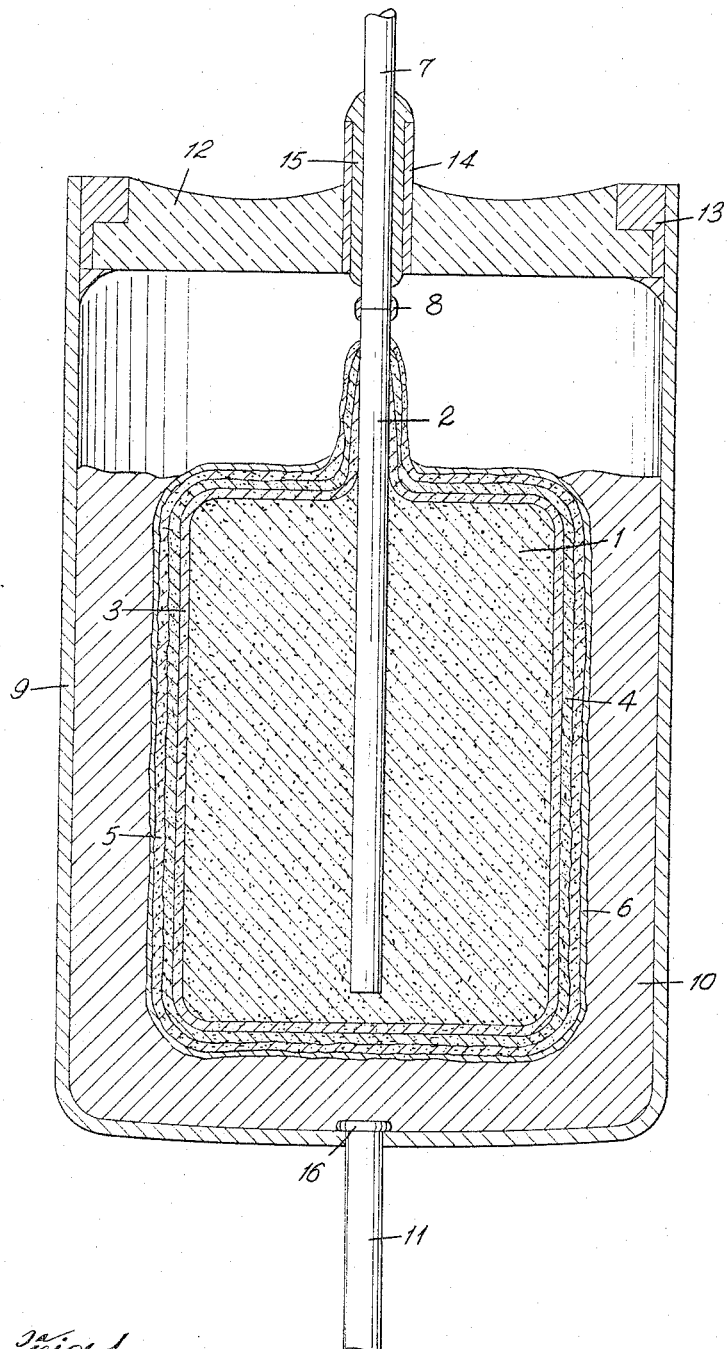

In order to gain a better understanding of the invention, and the problems encountered in the manufacture thereof, a more detailed description of solid electrolytic capacitors will be given with reference to the accompanying drawing in which FIGURE 1 is a cross-sectional view of a capacitor.

Capacitors to which this invention relates are prepared by compacting a powdered metal, preferably tantalum, into a pellet 1 which is generally cylindrical in shape, and which has a solid tantalum wire 2 embedded therein. The pellet 1 serves as the anode and the wire 2 as the anode lead. While tantalum is the preferred metal, other metals which are capable of forming an insulating oxide film thereon are also suitable; such metals include aluminum, tungsten, columbium, hafnium, titanium and zirconium. The compacted tantalum pellet 1 is physically weak at this stage of the manufacturing process and may contain minute quantities of impurities. In order to give mechanical strength to the pellet and to remove the impurities, the pellet is sintered in a vacuum furnace. Sintering normally takes place at a temperature in the range of 1500 to 2000° C. At this temperature, most of the impurities are vaporized and carried away in the vacuum stream. This temperature, however, is below the melting point of tantalum so that the porous nature of the pellet is not lost. The sintered pellet, which is physically strong, is thereafter anodized by well known techniques, for example, in an acid bath to form an oxide film or layer on the anode plug. This oxide film 3, which in the case of tantalum is $Ta_2O_5$, acts as the dielectric film of the capacitor. Since the anode is porous, the dielectric film permeates the innermost interstices of the pellet, covering all the exposed surface area of the pellet with the oxide film. After anodization is complete, the pellet is coated with a suitable film of a semiconductor 4. Manganese dioxide is the preferred semiconductor; however, other semiconductors, such as lead peroxide, have also been employed. These semiconductors have the property often referred to as "self-healing."

If the tantalum pentoxide film, which is the capacitor's dielectric, were perfectly continuous and of uniform thickness throughout the pellet, leakage current would be several orders of magnitude lower than that of the best capacitors yet made. The leakage currents normally exhibited flow, not through the dielectric, but through faults in the dielectric. These faults occur primarily because of impurities in the tantalum metal which have defied efforts at removal. Wherever an impurity is encountered, anodization cannot produce a continuous film of $Ta_2O_5$. The result is a minute hole in the dielectric film which becomes filled by the semiconductor layer 4.

Leakage currents would be many times larger than they are, were it not for the change in the structure of the semiconductor ($MnO_2$) layer which takes place opposite the fault sites. This change in structure, if induced by anodization, is referred to as "healing" or "reforming," while if it occurs during normal operation of the capacitor, it is referred to as self-healing. As D.C. voltage is applied to a newly manufactured capacitor, high current densities are produced in the faults. Since the faults are small (in the Angstrom-unit range), large total currents are not necessary to produce extremely high current densities. The high current produces joule heating in the $MnO_2$ opposite the fault. At elevated temperatures, $MnO_2$ undergoes spontaneous reduction to lower oxides such as $Mn_2O_3$. The lower oxides have much higher electrical resistivities than $MnO_2$, thus effectively reducing the leakage current which originally produced the heating. The magnitude of this effect can be deduced by noting that $MnO_2$ has a resistivity of approximately 10 ohm-cm. to 50 ohm-cm., while $Mn_2O_3$ has a resistivity of approximately $10^5$ ohm-cm. to $10^8$ ohm-cm.

The quality of the capacitors produced is to a very considerable degree dependent upon the quality of the semiconductive manganese dioxide ($MnO_2$) film produced. The semiconductor must cover the dielectric film completely and be of uniform thickness throughout the anode pellet, hence, it must permeate the innermost pores to the same extent as those near the surface of the pellet.

The semiconductive film of manganese dioxide 4 is usually formed in situ by pyrolysis of manganese nitrate, $Mn(NO_3)_2$. This method consists of impregnating the anodized porous tantalum anode 1 by dipping it in to a solution of manganese nitrate for from several seconds to several minutes, and after removing it from the solution, placing the dipped anode in an oven where it is heated for several minutes at a temperature in the range of from 200 to 400° C. While in the oven, the manganese nitrate is converted (pyrolyzed) to manganese dioxide. The dipping and heating steps are generally repeated several times in order to fill the pores of the anode with manganese dioxide as completely as possible. According to one method, the anode pellet, after removal from the oven is allowed to cool to ambient room temperature before being reimmersed in room temperature manganese nitrate solution. Cooling of the anode being thought to prevent boiling of the manganese nitrate solution and to minimize thermal shock to the sensitive anode oxide layer. According to an improved method, the anode pellet, after being washed with water, is preheated to a temperature of from 100 to 400° C. and then dipped in the manganese nitrate solution which is at a temperature below 70° C., preferably at ambient room temperature. The dipped anode is then heated to a temperautre of about 200 to 400° C. in an oven, as in the prior method, to convert the manganese nitrate to manganese dioxide within the pores of the anode. The anode is then removed from the oven and without further cooling immediately reimmersed in the relatively cool manganese nitrate solution. Following several such dipping and heating cycles, the anode is anodized again by conventional procedures. This second anodization is somtimes referred to as healing or reforming. As explained above, during the reforming process only the manganese dioxide in and around any defects in the tantalum oxide layer is converted to other more insulating oxides of maganese such as $Mn_2O_3$. This converted oxide helps to reduce current leakage through any defects in the anode oxide dielectric layer. The remaining portions of the manganese dioxide film continue to act as the dry electrolyte for the capacitor.

Following the reforming anodization, the entire cycle of dipping the anode in manganese nitrate solution, heating it in the oven and the reforming may be repeated if a thicker layer of semiconducting manganese dioxide is desired. When the desired thickness of $MnO_2$ has been built up, the anode pellet is coated with a layer of colloidal graphite 5 which serves to make good electrical contact with the layer of manganese dioxide. On top of the graphite layer 5, a cathode layer 6 is applied by dipping or spraying. Such layer is usually silver loaded paint. The essential electrical components of the capacitor are now complete. What remains is suitable encasement thereof.

In order to lengthen the tantalum lead wire 2, an additional length of solderable lead wire (such as solder coated nickel) 7 is welded thereto at the joint 8. The capacitor pellet is then inserted into a suitable container 9, for example, a solder coated brass can which is open at one end. The pellet is securely attached to the inside of container 9 by soft lead-tin solder 10 which makes good electrical contact with both the cathode layer 6 and the container 9. If the container 9 is made of conductive metal, the cathode lead wire 11 is welded at joint 16 to the closed end of container 9. The capacitor may then be sealed hermetically, if desired, by a glass or other insulating member 12 which is provided with a hole in the center thereof to permit the anode lead wire to emerge from the container. The insulating member 12 is soldered around its outer periphery to can 9 by a ring of solder 13. The anode lead wire 7 may be reinforced for additional strength by a metal sleeve 14 which fits snugly on its outer surface against the insulating member 12 and is soldered 15 at its inner surface to the anode lead wire 7. Plastic encapsulation is an alternate method of finishing solid electrolyte capacitors of this type.

It has been found that while capacitors prepared by the above described process are generally satisfactory for most electronic applications, they are unsatisfactory for some uses because of their high dissipation factors, non-uniform maintenance of capacitance with changes in frequency, applied voltage, and environment temperature. Additionally, capacitors made by the above described methods are unsatisfactory because the anode pellets are coated with a crusty buildup on their surfaces which often make it difficult and sometimes impossible to fit the pellets into their designated capacitor cans. It has been found that both problems, i.e. those relating to poor electrical characteristics and those relating to crust formation are to a considerable extent caused by the buildup of manganese dioxide on the outer surface of the porous metal anode, and that this excessive buildup is formed during pyrolysis of the manganese nitrate to the oxide in the conversion oven. The buildup is caused by exuding of the manganese nitrate from the interior of the porous anode to its surface as water is evaporated from the nitrate solution, particularly during the initial stages of the conversion, during which time the anode is heated to a temperature between 200 and 400° C. Since the cylindrical pellets are usually hung from the anode lead wire during the dipping and heating cycles, the action of gravity causes more buildup near the bottom of the pellets than near the top. Furthermore, this buildup is not uniform from one pellet to the next in normal production. Consequently, pellets which will not fit into the can must be put through a sizing dye to scrape off the excess buildup. The method of eliminating the buildup is a highly undesirable solution to the problem, since it not only requires an additional step in the manufacturing process, but is also very likely to damage the thin dielectric film of tantalum oxide. Since even pinhole damage to this film may make the capacitor useless by increasing its current leakage beyond acceptable limits, scraping off the buildup causes an increase in the number of rejects.

It has also been found that the buildup of oxide on the outside surface of the anode pellet tends to plug the pores of the anode, thus preventing efficient penetration of the manganese nitrate solution into the interior of the pellet after the first dip and conversion. Consequently, there results a nonuniform buildup of the semiconductor material across the diameter of the anode pellet, with a thick film being formed near the outside surface of the pellet and a progressively thinner film toward the center.

It is an object of this invention to produce solid electrolytic capacitors having improved electrical characteristics, such as improved dissipation factor, and the ability to maintain a uniform level of capacitance with wide variations in frequency, applied voltage and environmental temperature. It is another object of this invention to produce capacitor pellets having smooth, crust-free surfaces. It is another object of this invention to provide an improved process for making solid electrolytic capacitors which have the improved characteristics referred to above.

These and other objects are achieved by eliminating formation of the buildup of excess manganese dioxide on the exterior surface of the anode pellets. By eliminating such buildup it is possible to produce anode pellets having a uniformly smooth exterior surface and pellets in which there is a uniform amount of manganese dioxide across the diameter of the pellet, thus insuring a uniform film of semiconductive material throughout the entire surface area of the porous anode pellet. The elimination of the oxide buildup on the surface of the pellet is achieved by introducing steam into the conversion oven so that substantially all of the air in the oven is expelled and replaced by an atmosphere of steam at the desired temperature for conversion of the $Mn(NO_3)_2$ to $MnO_2$. In order to be fully effective, the steam must be introduced so as to engulf the anodes and substantially exclude the air during conversion of the manganese nitrate to the oxide.

A convenient means for introducing the steam is through a manifold at the bottom of the conversion oven. The manifold may be arranged to have a jet of steam directed at each anode. Any other means, however, of introducing the steam may be used as long as sufficient steam is used to substantially completely engulf the anodes and replace the air in the oven with steam which is at the conversion temperature, that is 200 to 400° C. The oven need not be airtight, since the steam is introduced under pressure and this keeps the oven under positive pressure and minimizes air leakage into the oven.

While not wishing to be limited by any theoretical explanation, it is believed that in the steam conversion method of this invention, the manganese nitrate solution is prevented from exuding to the surface of the pellet, and instead is converted to manganese dioxide in place throughout the pellet. Since the vaporization rate of the water in the manganese nitrate solution is suppressed by the vapor pressure of the steam in the oven and in the pores of the pellet itself, the rate of vaporization and, consequently, the rate of migration of the manganese nitrate solution to the surface of the pellet is reduced. As a result, the conversion takes place throughout the entire porous anode pellet. Furthermore, it is also probable that the kinetics of the conversion reaction are speeded up by the presence of steam as a result of more efficient heat transfer from the steam to the anode pellet than by the prior art method where heat transfer was from air to the anode pellet. A more rapid reaction rate would thus convert the manganese nitrate to the oxide before diffusion or evaporization could bring it to the surface of the pellet. Most likely, both of these factors influence the result which is the production of an anode pellet having a smooth exterior surface, no buildup of excess $MnO_2$ on the surface and a uniform distribution of $MnO_2$ across the diameter of the pellet.

Figure 2:
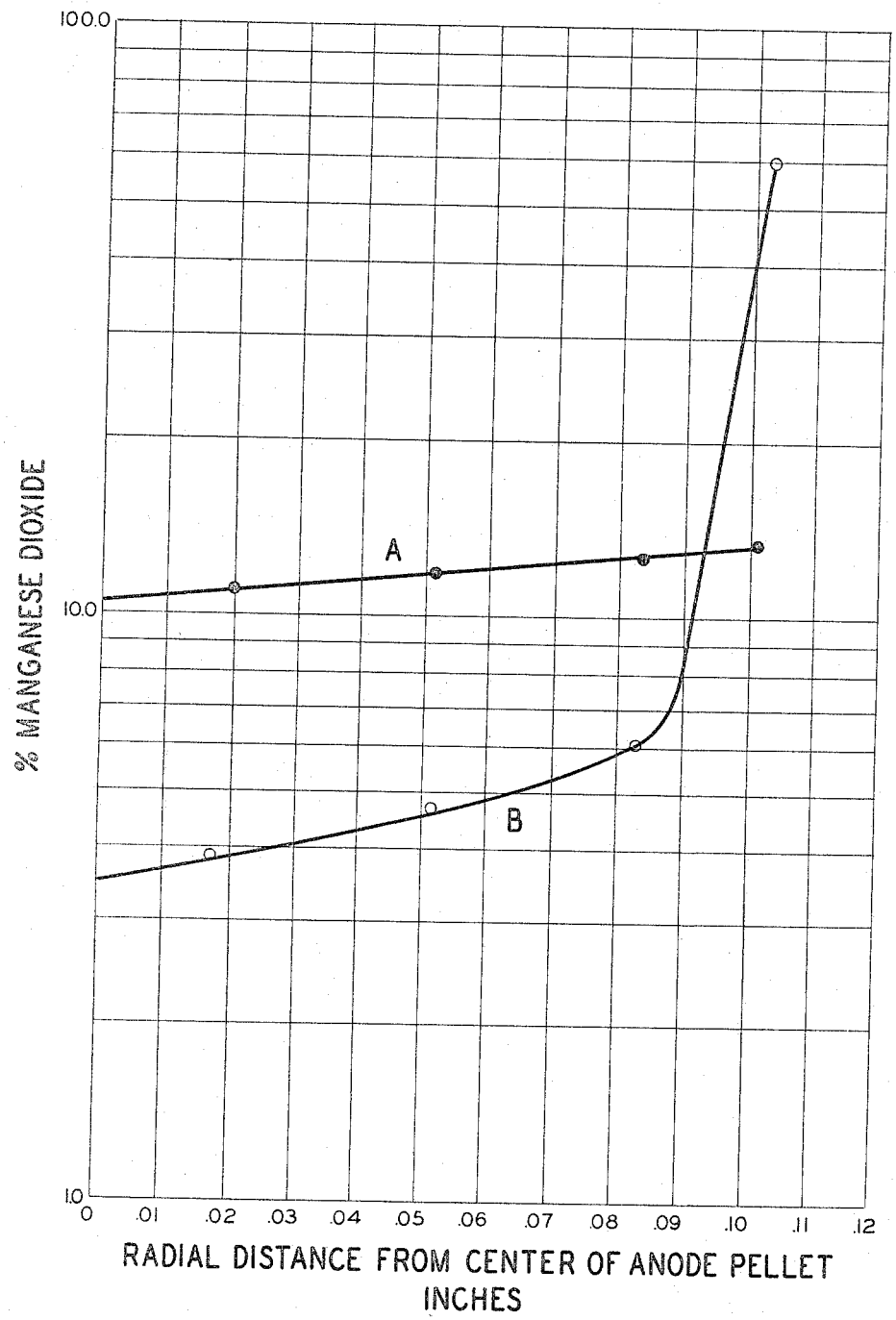

FIGURE 2 demonstrates graphically the uniformity of manganese dioxide distribution across the diameter of a 330 μf., 6 volt capacitor anode pellet made by the process of this invention as compared to an anode pellet made by the methods of the prior art. In FIGURE 2, curve A shows the percent $MnO_2$ of samples taken at various distances from the central axis of a cylindrical anode pellet made in accordance with this invention. The uniformity of distribution is evident from curve A which shows that the percent $MnO_2$ remains substantially 10% to 13% throughout. Curve B shows the percent $MnO_2$ of samples taken at various distances from the central axis of a cylindrical anode pellet made in accordance with the prior art. The variation in percent $MnO_2$ is evident from curve B which shows a large buildup (about 60% $MnO_2$) near the surface of the pellet, and then a very rapid decrease in the percent $MnO_2$ as one goes further toward the center of the pellet, with only 3 to 4% $MnO_2$ near the center thereof.

The following examples are given by way of illustration only, in order to describe the invention in greater detail, and are not intended to limit the scope thereof.

Example I

Porous tantalum anodes are prepared by compacting, sintering and anodizing them according to the prior art methods described above. The anodes are then dipped into an aqueous room temperature solution of $Mn(NO_3)_2$ having a specific gravity of 1.640 to 1.642 for about 10 to 15 seconds. The wet anodes are withdrawn from the solution and then inserted into the conversion oven which is maintained at a temperature in the range of 225 to 235° C. and which has superheated steam injected into it through a manifold located at the bottom of the oven. The temperature of the steam is maintained the same as that of the oven to prevent cooling. An orifice of the manifold is aimed at each anode so as to completely engulf them in an atmosphere of steam. The anodes remain in the oven for about four to five minutes during which time the conversion takes place. Thereafter, the anodes are withdrawn and allowed to cool about 90 seconds before being dipped again in the manganese nitrate solution. The anodes are dipped and heated three or more additional times as just described, before being anodized again to heat or reform any defects in the manganese dioxide layer. Following the healing or reforming, the entire process consisting of two or more additional cycles of dipping and steam conversion are repeated, after which the anodes are healed or reformed a second time. The resulting anode pellets are essentially free of crusty manganese dioxide buildup on their outer surfaces, and are nearly as smooth as they were prior to being coated with the semiconductor. Each anode pellet is then coated with a cathode layer and encased along with suitable leads in a metal can according to conventional methods.

Example II

Porous tantalum anodes are prepared by compacting, sintering and anodizing them according to the prior art methods described above. The anodes are then dipped into an aqueous room temperature solution of $Mn(NO_3)_2$ having a specific gravity of 1.675 to 1.677 for about 15 to 45 seconds. The wet anodes are withdrawn from the solution and then inserted into the conversion oven which is maintained at a temperature of 300° C., and which has superheated steam injected into it through a manifold located at the bottom of the oven. The temperature of the steam is maintained the same as that of the oven to prevent cooling. An orifice of the manifold is aimed at each anode so as to completely engulf them in an atmosphere of steam. The anodes remain in the oven for about 2 to 3 minutes during which time the conversion takes place. Thereafter, they are withdrawn and allowed to cool about 90 seconds before being dipped again. The anodes are then dipped and heated three or more times as just described, before being anodized again to heal or reform any defects in the manganese dioxide layer. Following the healing or reforming, the entire process, consisting of three or more additional cycles of dipping and steam conversion, is repeated, after which the anodes are healed or reformed a second time. The resulting anode pellets are essentially free of crusty manganese dioxide buildup on their outer surfaces, and are nearly as smooth as they were prior to being coated with the semiconductor. The anode pellets are then coated with a cathode layer and encapsulated along with suitable leads in plastic by conventional means.

Electrical charcteristics of capacitors produced by the process of this invention as described above are tabulated and compared with those of capacitors produced by prior art methods in Tables I through IV below. The critical difference in the processes whose products are compared below is that air was replaced by superheated steam as the atmosphere in the conversion oven in accordance with this invention.

TABLE I

[Comparison of dissipation factors]

| Process Method | Capacitor Type—1 μf., 50 volts Average Dissipation Factor at 120 cycles per second | | | |
|---|---|---|---|---|
| | 0 v. bias | | 50 v. bias, 25° C. | 34 v. bias, 125° C. |
| | 25° C. | 125° C. | | |
| Prior Art, percent | 3.19 | 2.27 | 1.06 | 1.16 |
| Invention, percent | 1.75 | 1.58 | .75 | 1.10 |
| Improvement Ratio (Prior Art/Invention) | 1.82 | 1.44 | 1.41 | 1.05 |

| Process Method | Capacitor Type—330 μf., 6 volts Average Dissipation Factor at 120 cycles per second | | | |
|---|---|---|---|---|
| | 0 v. bias | | 6 v. bias, 25° C. | 4 v. bias, 125° C. |
| | 25° C. | 125° C. | | |
| Prior Art, percent | 5.4 | 7.6 | 5.3 | 7.3 |
| Invention, percent | 4.4 | 5.5 | 4.3 | 5.3 |
| Improvement Ratio (Prior Art/Invention) | 1.23 | 1.38 | 1.23 | 1.38 |

TABLE II

[Capacitance versus temperature]

| Process Method | Capacitor Type—1 µf., 50 volts Average Capacitance at 120 cycles per second ||||||
|---|---|---|---|---|---|---|
| | 0 v. bias || Capacitance Change | 50 v. bias, 25° C., µf. | 34 v. bias, 125° C., µf. | Capacitance Change |
| | 25° C., µf. | 125° C., µf. | | | | |
| Prior Art | .916 | 1.037 | [1] +13.2 | .891 | 1.005 | [1] +12.8 |
| Invention | .913 | .970 | [1] +6.2 | .894 | .943 | [1] +5.5 |
| Improvement Ratio (Prior Art/Invention) | | | 2.13 | | | 2.33 |

| Process Method | Capacitor Type— 330 µf., 6 volts Average Capacitance at 120 cycles per second ||||||
|---|---|---|---|---|---|---|
| | 0 v. bias || Capacitance Change | 6 v. bias, 25° C., µf. | 4 v. bias, 125° C., µf. | Capacitance Change |
| | 25° C., µf. | 125° C., µf. | | | | |
| Prior Art | 305.5 | 357.0 | [1] +16.9 | 302.1 | 354.5 | [1] +17.4 |
| Invention | 304.3 | 340.9 | [1] +12.0 | 302.4 | 337.2 | [1] +11.5 |
| Improvement Ratio (Prior Art/Invention) | | | 1.41 | | | 1.51 |

[1] Percent.

TABLE III

[Capacitance versus bias voltage]

| Process Method | Capacitor Type—1 µf., 50 volts Average Capacitance at 120 cycles per second ||||||
|---|---|---|---|---|---|---|
| | 25° C. || Capacitance Change | 125° C. || Capacitance Change |
| | 0 v. bias | 50 v. bias | | 0 v. bias | 34 v. bias | |
| Prior Art, µf | .916 | .891 | −.025 | 1.037 | 1.005 | −.032 |
| Invention, µf | .913 | .894 | −.019 | .970 | .943 | −.027 |
| Improvement Ratio (Prior Art/Invention) | | | 1.32 | | | 1.19 |

| Process Method | Capacitor Type—330 µf., 6 volts Average Capacitance at 120 cycles per second ||||||
|---|---|---|---|---|---|---|
| | 25° C. || Capacitance Change | 125° C. || Capacitance Change |
| | 0 v. bias | 6 v. bias | | 0 v. bias | 4 v. bias | |
| Prior Art, µf | 305.5 | 302.1 | −3.4 | 357.0 | 354.5 | −2.5 |
| Invention, µf | 304.3 | 302.4 | −1.9 | 340.9 | 337.2 | −3.7 |
| Improvement Ratio (Prior Art/Invention) | | | 1.78 | | | .67 |

TABLE IV

[Capacitance versus frequency]

| Process Method | Capacitor Type | Average Capacitance at 0 Volt bias and 25° C. ||| Improvement Ratio (Prior Art/Invention) |
|---|---|---|---|---|---|
| | | 120 cycles per second, µf. | 50 K cycles per second, µf. | Capacitance Change, percent | |
| Prior Art | 1 µf, 50 volt | .91 | .63 | −30.8 | 4.6 |
| Invention | do | .89 | .83 | −6.7 | |
| Prior Art | 4.7 µf, 50 volt | 4.70 | 3.0 | −36.2 | 1.5 |
| Invention | do | 4.70 | 3.57 | −24.0 | |
| Prior Art | 68 µf, 15 volt | 64.3 | 19.8 | −69.2 | 3.3 |
| Invention | do | 71.5 | 56.5 | −21.0 | |
| Prior Art | 220 µf, 10 volt | 197 | 80 | −59.3 | 1.75 |
| Invention | do | 240 | 159 | −33.8 | |
| Prior Art | 330 µf, 6 volt | 295 | 76 | −74.3 | 2.1 |
| Invention | do | 309 | 200 | −35.3 | |

The results of Table I clearly show an improvement in dissipation factor of the capacitors prepared by the methods of this invention. Tables II, III, and IV each demonstrate in turn that the capacitance of the capacitors of this invention are superior to those prepared by prior art methods with respect to maintenance of uniform capacitance with changes in temperature, bias voltage and frequency respectively.

The capacitors produced by the method of this invention present additional advantages, over those made by prior art methods, beyond having the improved electrical characteristics, described in Tables I through IV. Since capacitors made by this invention have a uniformly smooth exterior surface and essentially no crusty buildup of manganese dioxide, the size of the capacitor pellet is only slightly increased during processing (the film formed thereon being in the order of .015" to .025" in thickness compared to .100" to .125" for the prior art process on a 330 µf. capacitor pellet). Consequently, it is possible to encase the pellets of this invention in smaller containers than pellets produced by prior art techniques. This results in being able to manufacture capacitors of higher capacity for a given sized can, or conversely to obtain greater capacitance for the same size can, than is possible by prior art methods.

What is claimed is:

1. In the process of manufacturing a solid electrolyte capacitor comprising the steps of
    (1) compacting, sintering and anodizing a porous metal anode,
    (2) dipping the anodized anode pellet into a solution of manganese nitrate,
    (3) heating the dipped anode in an oven to convert the manganese nitrate to manganese oxide,
    (4) repeating Steps 2 and 3 a sufficient number of times to substantially fill the pores of the anode with manganese oxide,
    (5) reanodizing the porous metal anode pellet,
    (6) applying a conductive cathode layer to the anodized metal anode pellet, and
    (7) encasing the capacitor in a suitable container together with suitable anode and cathode leads,
the improvement which comprises introducing sufficient steam into the conversion oven to substantially expel and replace the air from the oven and to substantially completely engulf the anode pellet in an atmosphere of steam, the steam being of substantially the same temperature as the oven temperature, and the oven temperature being maintained in the range of from about 200 to 400° C.

2. The process of claim 1 wherein the anode metal is tantalum.

3. The process of claim 1 wherein the steam is superheated steam and the oven temperature is maintained in the range of 225 to 300° C.

4. A solid electrolyte capacitor having been prepared by the process of claim 1.

5. A solid electrolyte capacitor having been prepared by the process of claim 2.

6. In the process of manufacturing a solid electrolytic capacitor comprising the steps of
    (1) compacting, sintering and anodizing a porous metal anode,
    (2) dipping the anodized anode pellet into a solution of manganese nitrate,
    (3) heating the dipped anode in an oven to convert the manganese nitrate to manganese oxide,
    (4) repeating Steps 2 and 3 a sufficient number of times to substantially fill the pores of the anode with manganese oxide,
    (5) reanodizing the porous metal anode pellet,
    (6) applying a conductive cathode layer to the anodized metal anode pellet, and
    (7) encasing the capacitor in a suitable container together with suitable anode and cathode leads,
the improvement comprising introducing steam into the conversion oven to replace part of the air in the oven and to provide therein an atmosphere of steam and air.

References Cited
UNITED STATES PATENTS

| | | | |
|---|---|---|---|
| 2,766,508 | 10/1956 | Le Loup | 29—25.3 |
| 2,936,514 | 5/1960 | Millard | 29—25.31 |
| 3,036,249 | 5/1962 | Hall | 317—230 |
| 3,066,247 | 11/1962 | Robinson | 317—230 |
| 3,093,883 | 6/1963 | Harring et al. | 29—25.42 |
| 3,100,329 | 8/1963 | Sherman | 29—25.31 |
| 3,123,894 | 3/1964 | Von Bonin | 29—25.31 |
| 3,301,704 | 1/1967 | Zind | 117—200 |

JOHN H. MACK, *Primary Examiner.*

W. VAN SISE, *Assistant Examiner.*